(12) United States Patent
Ishihama et al.

(10) Patent No.: US 9,160,902 B2
(45) Date of Patent: Oct. 13, 2015

(54) IMAGING APPARATUS EQUIPPED WITH IMAGE GAIN ADJUSTMENT FUNCTION

(71) Applicant: CASIO COMPUTER CO., LTD., Shibuya-ku, Tokyo (JP)

(72) Inventors: Takanori Ishihama, Tokyo (JP); Takashi Itoh, Tokyo (JP); Junichi Sugiyama, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 221 days.

(21) Appl. No.: 13/798,020

(22) Filed: Mar. 12, 2013

(65) Prior Publication Data

US 2013/0242128 A1  Sep. 19, 2013

(30) Foreign Application Priority Data

Mar. 15, 2012 (JP) ................................. 2012-059471
Aug. 9, 2012 (JP) ................................. 2012-177203

(51) Int. Cl.
*H04N 5/222* (2006.01)
*H04N 5/225* (2006.01)
(Continued)

(52) U.S. Cl.
CPC ............. *H04N 5/225* (2013.01); *H04N 5/2352* (2013.01); *H04N 5/23241* (2013.01)

(58) Field of Classification Search
CPC .. H04N 5/225; H04N 5/23241; H04N 5/2352
USPC ............. 348/220.1, 221.1, 222.1, 229.1, 244, 348/255, 333.02, 333.13, 372
See application file for complete search history.

(56) References Cited

U.S. PATENT DOCUMENTS 6,603,508 B1 * 8/2003 Hata .......................... 348/229.1
7,304,679 B1 * 12/2007 Johnson et al. .......... 348/333.11
(Continued)

FOREIGN PATENT DOCUMENTS

JP     2007-049622 A    2/2007
JP     2007-235508 A    9/2007
(Continued)

OTHER PUBLICATIONS

Japanese Office Action dated Oct. 22, 2013 (and English translation thereof) in counterpart Japanese Application No. 2012-177203.

*Primary Examiner* — Lin Ye
*Assistant Examiner* — Chriss Yoder, III
(74) *Attorney, Agent, or Firm* — Holtz, Holtz, Goodman & Chick PC

(57) ABSTRACT

An imaging apparatus is equipped with an analog block, an imaging condition determination section, and an analog gain control section. Current consumption of the analog block changes in accordance with an analog gain, which is an amplification ratio of outputs of an imaging device. The imaging condition determination section determines imaging conditions, including the analog gain, in accordance with the brightness of an imaging object. Depending on a state of the imaging apparatus, the analog gain control section alters the analog gain determined by the imaging condition determination section so as to reduce the current consumption of the analog block. Thus, in this imaging apparatus, the current consumption of the analog block may be reduced by the performance of control that alters the analog gain in accordance with the state of the imaging apparatus. Thus, the state of the imaging apparatus may be regulated.

16 Claims, 8 Drawing Sheets

(51) Int. Cl.
*H04N 5/232* (2006.01)
*H04N 5/235* (2006.01)

(56) References Cited

U.S. PATENT DOCUMENTS

| | | | |
|---|---|---|---|
| 7,456,868 B2 * | 11/2008 | Calderwood | 348/229.1 |
| 7,570,287 B2 * | 8/2009 | Tsuruoka | 348/241 |
| 7,738,023 B2 * | 6/2010 | Suzuki | 348/317 |
| 8,687,110 B1 * | 4/2014 | Gardner | 348/372 |
| 2004/0099920 A1 * | 5/2004 | Rossi et al. | 257/448 |
| 2008/0062276 A1 * | 3/2008 | Hirai et al. | 348/229.1 |

FOREIGN PATENT DOCUMENTS

| | | |
|---|---|---|
| JP | 2008-131251 A | 6/2008 |
| JP | 2009-008961 A | 1/2009 |
| JP | 2009-273007 A | 11/2009 |
| JP | 2011-164244 A | 8/2011 |
| JP | 2011-244288 A | 12/2011 |
| JP | 2012-010228 A | 1/2012 |

* cited by examiner

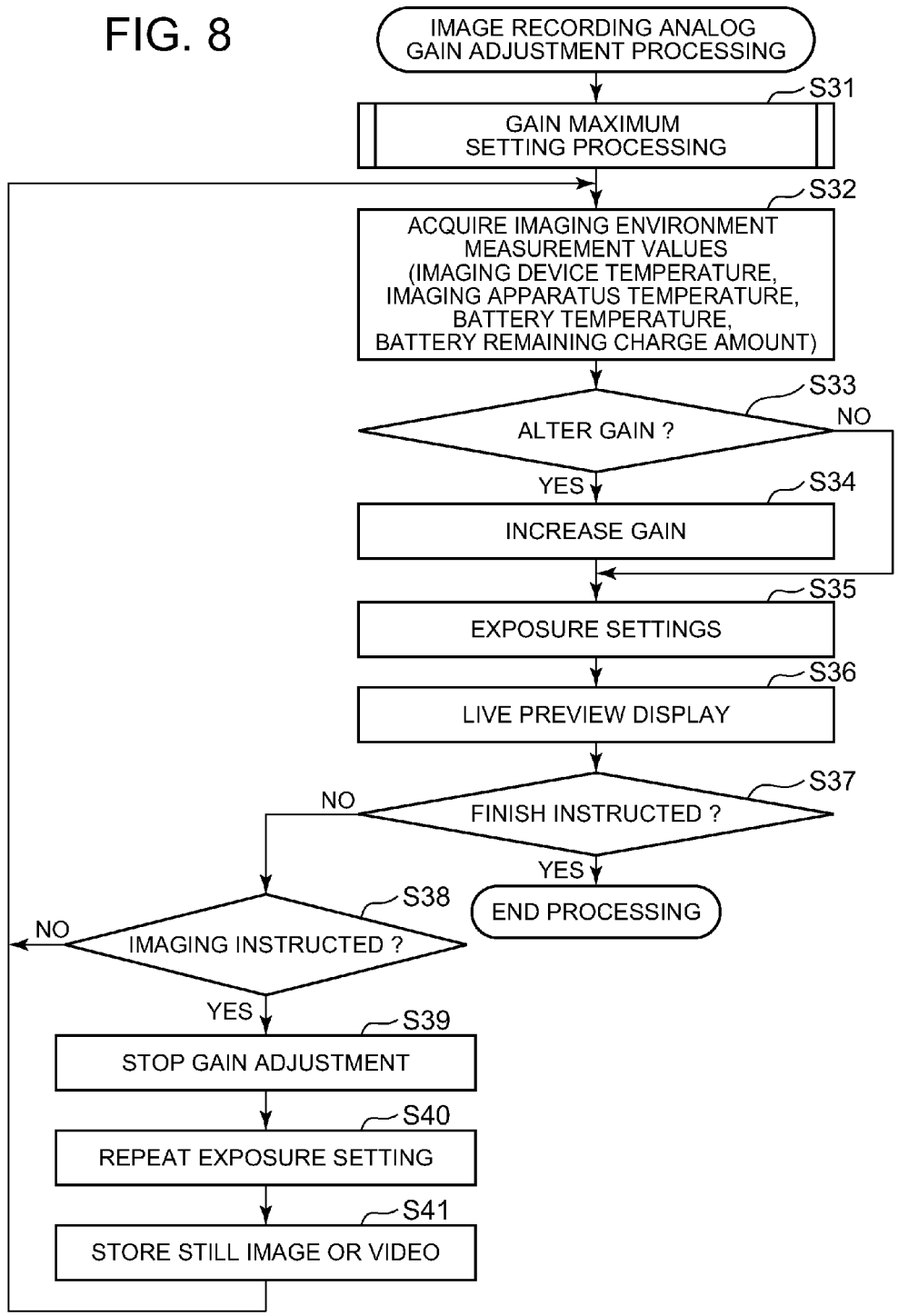

IMAGING APPARATUS EQUIPPED WITH IMAGE GAIN ADJUSTMENT FUNCTION

This application is based on and claims the benefit of priority from Japanese Patent Application Nos. 2012-059471 and 2012-177203, respectively filed on 15 Mar. 2012 and 9 Aug. 2012, the contents of which are incorporated herein by reference.

BACKGROUND OF THE INVENTION

1. Field of the Invention

The present invention relates to an imaging apparatus, an imaging method and a storage medium.

2. Related Art

Recently, the image processing capabilities of CPUs in imaging apparatuses are increasing. Correspondingly, computation processes and the like are becoming more numerous, and overall current consumption of imaging apparatuses is increasing. As a result, heat generation amounts of imaging apparatuses are increasing and battery lives are falling. As a response to these increases in heat generation amounts, Japanese Unexamined Patent Publication No. 2008-131251 discloses a technology that cools an imaging apparatus by employing a cooling member, a cooling structure or the like.

SUMMARY OF THE INVENTION

In order to solve the problem described above, an imaging apparatus in accordance with a first aspect of the present invention includes:

an analog block in which current consumption changes in accordance with an analog gain, which is an amplification ratio of outputs of an imaging device;

a determination section that determines imaging conditions including the analog gain in accordance with a brightness of an object; and an analog gain control section that, in accordance with a state of the imaging apparatus, alters the analog gain determined by the determination section such that the current consumption of the analog block is reduced.

Further, in order to solve the problem described above, an imaging method in accordance with a second aspect of the present invention is an imaging method of an imaging apparatus that includes an analog block in which current consumption changes in accordance with an analog gain, which is an amplification ratio of outputs of an imaging device, the imaging method including:

a determination step of determining imaging conditions including the analog gain in accordance with a brightness of an object; and an analog gain control step of, in accordance with a state of the imaging apparatus, altering the analog gain determined in the determination step such that the current consumption of the analog block is reduced.

Further still, in order to solve the problem described above, a computer readable storage medium in accordance with a third aspect of the present invention is a non-transitory computer readable storage medium having stored therein a program executable by a computer controlling an imaging apparatus that includes an analog block in which current consumption changes in accordance with an analog gain, which is an amplification ratio of outputs of an imaging device, the program causing the computer to realize:

a determination function that determines imaging conditions including the analog gain in accordance with a brightness of an object; and an analog gain control function that, in accordance with a state of the imaging apparatus, alters the analog gain determined by the determination function such that the current consumption of the analog block is reduced.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 8 is a flowchart describing the flow of the analog gain adjustment processing for image recording that is executed by the imaging apparatus of FIG. 1 with the functional structures of FIG. 7.

DETAILED DESCRIPTION OF THE INVENTION

In the following, embodiments of the present invention are explained using the attached drawings.

—First Embodiment—

Figure 1:
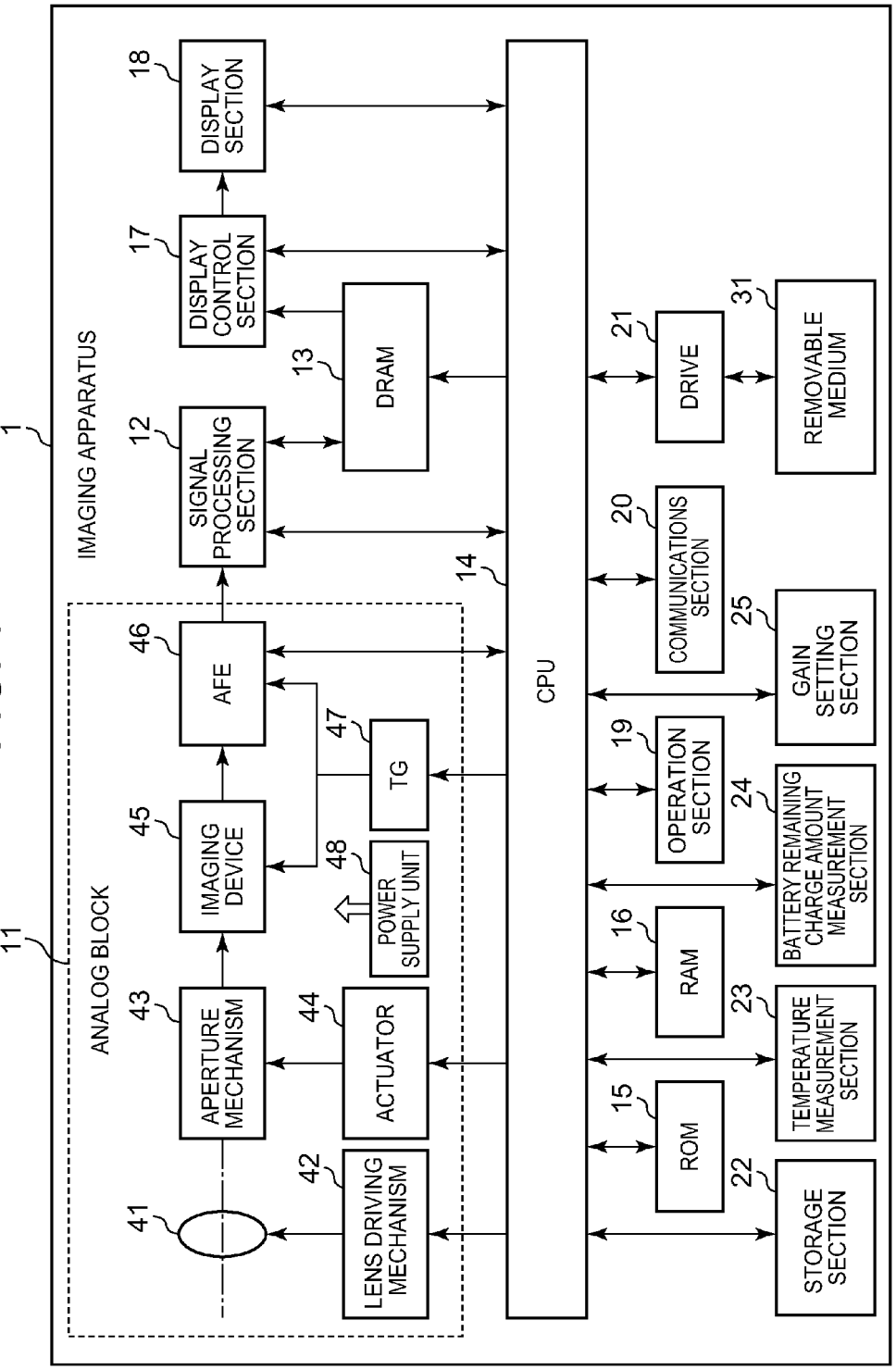
FIG. 1 is a block diagram showing hardware structures of an imaging apparatus in accordance with an embodiment of the present invention.

FIG. 1 is a block diagram showing hardware structures of an imaging apparatus 1 according to a first embodiment of the present invention. The imaging apparatus 1 may be constituted by, for example, a digital camera.

The imaging apparatus 1 is provided with an analog block 11, a signal processing section 12, a dynamic random access memory (DRAM) 13, a central processing unit (CPU) 14, a read-only memory (ROM) 15, a random access memory (RAM) 16, a display control section 17, a display section 18, an operation section 19, a communications section 20, a drive 21, a storage section 22, a temperature measurement section 23, a battery remaining charge amount measurement section 24 and a gain setting section 25.

The analog block 11 is provided with an optical lens 41, a lens driving mechanism 42, an aperture mechanism 43, an actuator 44, an imaging device 45, an analog front end (AFE) 46, a timing generator (TG) 47 and a power supply unit 48.

The optical lens 41 is structured with, for example, a focusing lens, a zoom lens and so forth. The focusing lens forms an image of an object on a light detection surface of the imaging device 45. The zoom lens arbitrarily varies the focusing distance in a certain range.

The lens driving mechanism 42 drives the various lenses in accordance with control by the CPU 14. For example, the lens driving mechanism 42 implements automatic focus (AF) processing by moving the focusing lens in accordance with control by the CPU 14.

The aperture mechanism 43 is structured by, for example, a plural number of aperture blades and the like, and adjusts light amounts that are incident on the imaging device 45 by altering a degree of opening/closing of the aperture blades (the aperture value). Thus, the exposure is adjusted by adjustment of the aperture value and shutter speed, which is described below.

The actuator 44 opens and closes the aperture blades of the aperture mechanism 43 in accordance with control by the CPU 14.

The imaging device 45 is structured by, for example, a complementary metal oxide semiconductor (CMOS) photoelectric conversion device or the like. An object image is incident on the imaging device 45 from the optical lens 41 via the aperture mechanism 43. In accordance with clock pulses supplied from the TG 47, the imaging device 45 photoelectrically converts (images) the object image at intervals of a certain duration, accumulates image signals at respective pixels, and outputs the accumulated image signals in the form of analog signals. The certain duration for which the image signals are accumulated corresponds to the shutter speed. Thus, exposure can be controlled by controlling the certain duration (the shutter speed) together with the above-mentioned aperture value.

The AFE 46 is structured by an amplification circuit (not shown in the drawings), which is constituted with a correlated double sampling (CDS) circuit, an analog amplifier and suchlike, and an analog/digital (A/D) converter (not shown in the drawings). The amplification circuit amplifies the analog image signals supplied from the imaging device 45 in accordance with an image sensitivity (i.e., adjusts the gain). In accordance with clock pulses supplied from the TG 47, the A/D converter applies various kinds of signal processing such as A/D conversion processing and the like to the analog image signals supplied from the imaging device 45, generating digital image signals (which are hereinafter referred to as "captured image data").

In accordance with control by the CPU 14, the TG 47 supplies clock pulses at intervals of the certain duration to both the imaging device 45 and the AFE 46.

The power supply unit 48 supplies electric current to the respective structures of the imaging apparatus 1, as a drive source of the imaging apparatus 1, via a power supply circuit (not shown in the drawings).

The signal processing section 12 is structured by, for example, a digital signal processor (DSP) and the like, and applies various kinds of signal processing such as gamma correction and the like to the captured image data supplied from the AFE 46 and such.

The DRAM 13 temporarily stores the captured image data to which signal processing has been applied by the signal processing section 12.

The CPU 14 executes various processes in accordance with a program recorded in the ROM 15, in order to control overall operations of the imaging apparatus 1, for example, controlling exposure adjustment and the like. A specific example of processing at the CPU 14 is described below with reference to FIG. 2, etc.

Data and suchlike that is required for execution of the various processes by the CPU 14 is stored in the RAM 16 as appropriate.

In accordance with control by the CPU 14, the display control section 17 acquires captured image data or the like stored in the DRAM 13, a removable medium 31 or the like, and displays a corresponding captured image at the display section 18.

That is, the display section 18 is structured by a liquid crystal display or the like and displays various images, such as the captured images and the like.

The operation section 19 is constituted with various buttons and the like and inputs various kinds of information in accordance with instruction operations by a user.

The communications section 20 controls communications with other apparatuses (not shown in the drawings) over networks, including the Internet.

The drive 21 controls reading and writing to the removable medium 31 that is mounted therein. The removable medium 31 is constituted by a magnetic disc, an optical disc, a magneto-optical disc, a semiconductor memory or the like. The removable medium 31 stores various kinds of data, such as captured image data.

The storage section 22 is structured with a hard disc, a dynamic random access memory (DRAM) or the like, and stores data of various images.

The temperature measurement section 23 measures respective temperatures of the imaging apparatus 1, the imaging device 45 and the power supply unit 48. The battery remaining charge amount measurement section 24 measures a battery remaining charge amount of the power supply unit 48.

The gain setting section 25 is constituted with various buttons and the like and inputs setting information of an analog gain of the imaging device 45 (hereinafter referred to as the "analog gain") in accordance with instruction operations by a user. The analog gain setting information includes a change value when the analog gain is to be changed, a maximum value when an upper limit value of the analog gain is to be set, and the like.

Figure 2:
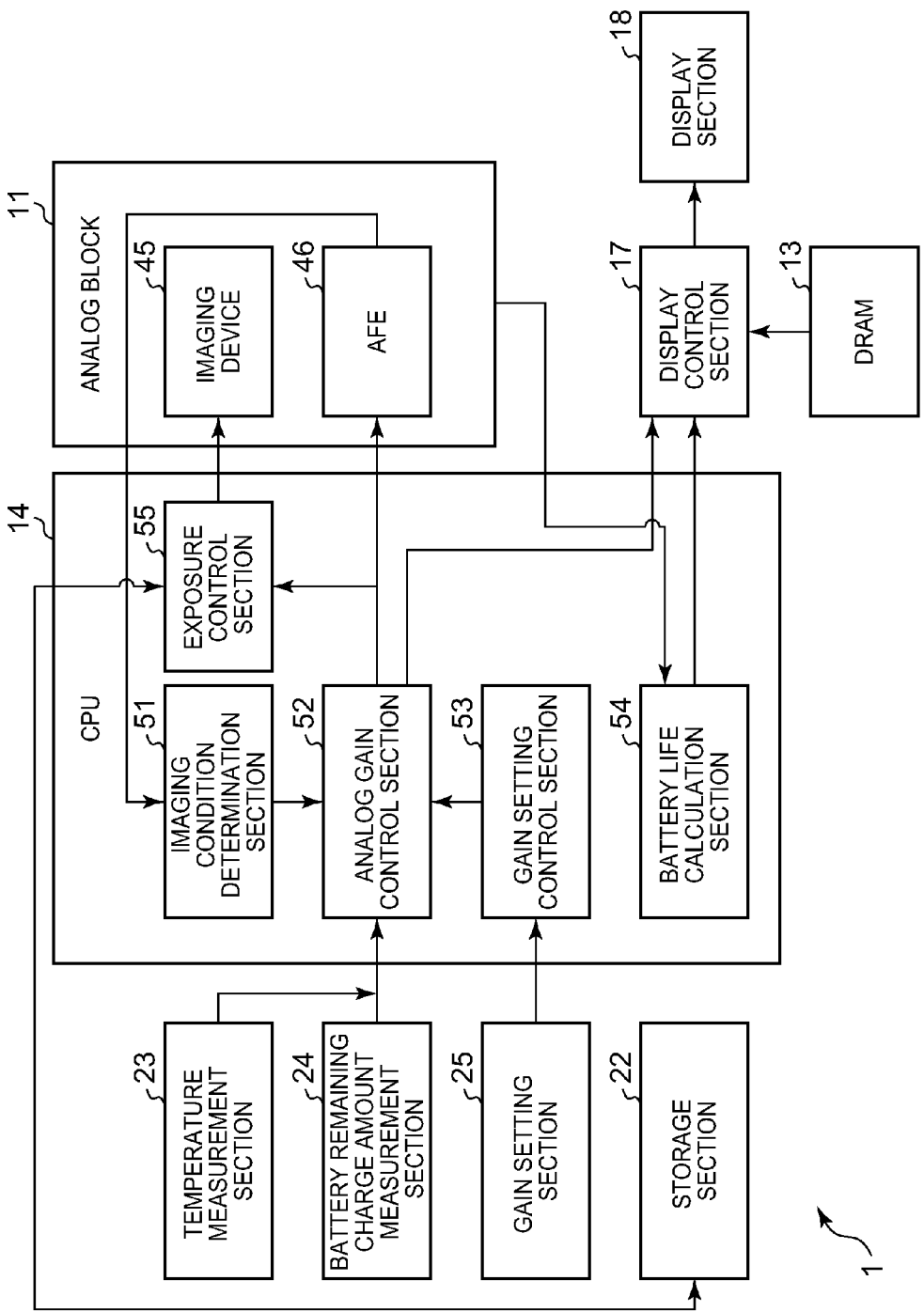
FIG. 2 is a functional block diagram illustrating, of functional structures of the imaging apparatus of FIG. 1, functional structures for implementing analog gain adjustment processing.

FIG. 2 is a functional block diagram illustrating, of functional structures of this imaging apparatus 1, functional structures for implementing analog gain adjustment processing.

The term "analog gain adjustment processing" as used herein includes a sequence of processing that, from when imaging of an object by the imaging apparatus 1 is started until exposure settings are implemented, takes measurements of the imaging environment of the imaging apparatus and adjusts the analog gain in accordance with the measurement results.

When the analog gain adjustment processing is being executed, the CPU 14 functions as an imaging condition determination section 51, an analog gain control section 52, a gain setting control section 53, a battery life calculation section 54 and an exposure control section 55.

When execution of the analog gain adjustment processing is started, the imaging condition determination section 51 receives data from the AFE 46 and determines an analog gain on the basis of the received data. Then, on the basis of the received data, the imaging condition determination section 51 determines an aperture value and shutter speed, which are imaging conditions.

In accordance with respective temperatures of the imaging apparatus 1, the imaging device 45 and the power supply unit 48 measured by the temperature measurement section 23 and battery remaining charge amounts of the power supply unit 48 measured by the battery remaining charge amount measurement section 24, the analog gain control section 52 alters the current consumption of the analog block 11 by controlling the analog gain. At a solid state imaging device, operation states of a reference signal that is used for A/D conversion change when the analog gain is altered. Consequently, when the analog gain is increased, the solid state imaging device operates at lower currents. However, when the analog gain is increased, noise in captured images increases.

The analog gain control section 52 outputs the altered analog gain to the AFE 46. Accordingly, the amplification ratio, of analog image signals supplied from the imaging device 45, in the amplification circuit provided in the AFE 46 is altered.

The analog gain control section 52 also outputs the altered analog gain to the display control section 17 and the exposure control section 55.

The higher the respective temperatures of the imaging apparatus 1, the imaging device 45 and the power supply unit 48 measured by the temperature measurement section 23, the higher the analog gain control section 52 raises the analog gain, and the lower the battery remaining charge amounts of the power supply unit 48 measured by the battery remaining charge amount measurement section 24, the higher the analog gain control section 52 raises the analog gain. If an amount of noise generated consequent to the raising of the analog gain exceeds a predetermined threshold, the analog gain control section 52 may perform control to lower the analog gain such that the noise amount is at or below the predetermined threshold.

The gain setting control section 53 outputs the analog gain setting information inputted by the gain setting section 25 to the analog gain control section 52. Accordingly, the analog gain control section 52 may output an altered value of the analog gain inputted by the gain setting section 25. Further, the analog gain control section 52 may output the maximum value of analog gain inputted by the gain setting section 25. Thus, the analog gain control section 52 may adjust the analog gain in a range that does not exceed the analog gain maximum value.

The battery life calculation section 54 acquires the value of a current flowing in the analog block 11, which changes with the analog gain controlled by the analog gain control section 52, from the analog block 11 and outputs the current value to the display control section 17.

The exposure control section 55 acquires the analog gain controlled by the analog gain control section 52, and controls the aperture value and shutter speed by outputs to the aperture mechanism 43 (see FIG. 1) and the imaging device 45.

The exposure control section 55 also acquires the analog gain controlled by the analog gain control section 52 and, on the basis of the acquired analog gain, alters a program chart for exposure control that is stored in the storage section 22 and controls exposure settings.

The display control section 17 receives the analog gain outputted by the analog gain control section 52, acquires a noise sample image corresponding to the received analog gain (see FIG. 5A, FIG. 5B and FIG. 5C) from the DRAM 13, and displays the noise sample image at the display section 18.

The display control section 17 also receives a battery remaining charge amount of the power supply unit 48 calculated by the battery life calculation section 54, acquires a battery life image corresponding to the received value of the battery remaining charge amount (see FIG. 5D, FIG. 5E and FIG. 5F) from the DRAM 13, and displays the battery life image at the display section 18.

Next, the analog gain adjustment processing executed by this imaging apparatus 1 with the functional structures of FIG. 2 is described with reference to FIG. 3 and FIG. 4.

Figure 3:
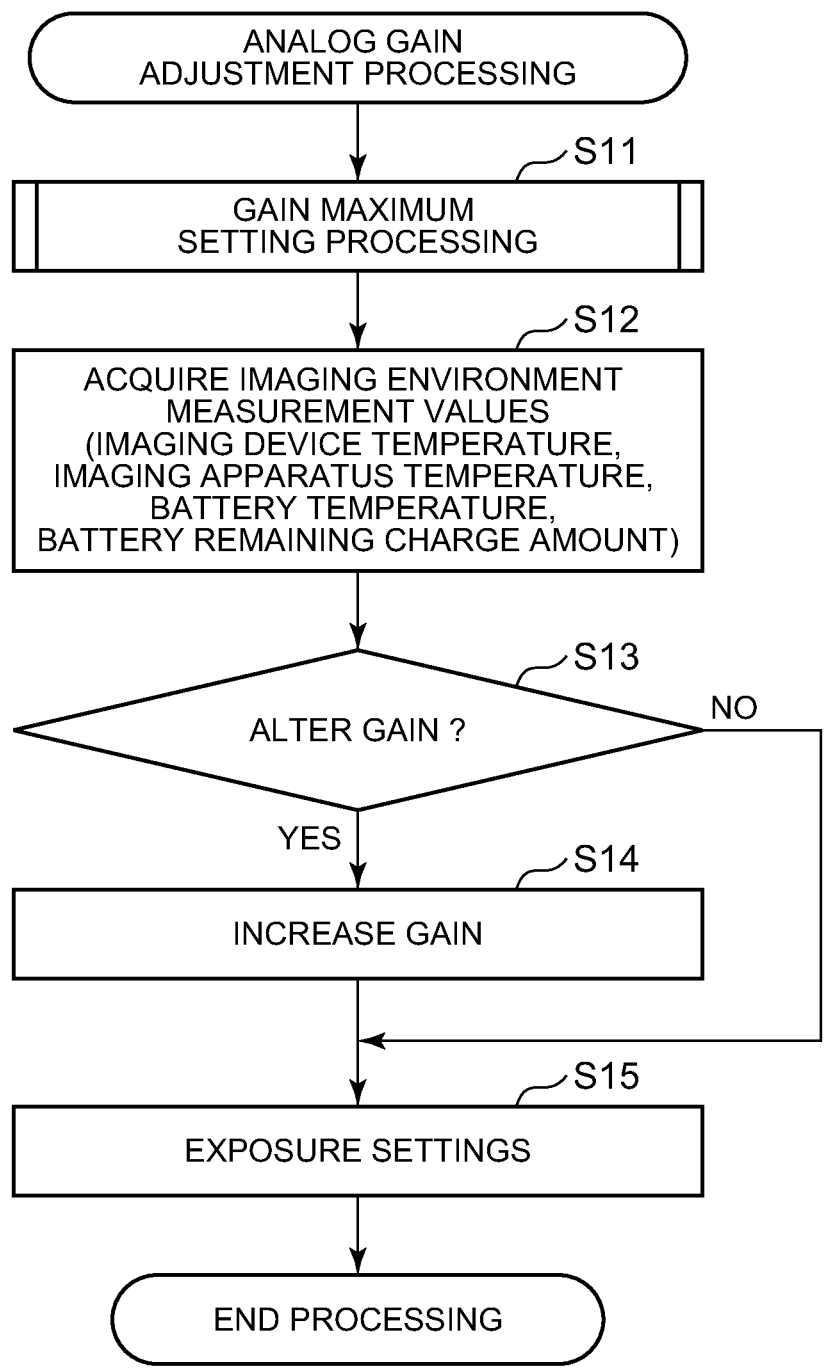
FIG. 3 is a flowchart describing the flow of the analog gain adjustment processing executed by the imaging apparatus of FIG. 1 with the functional structures of FIG. 2.
Figure 4:
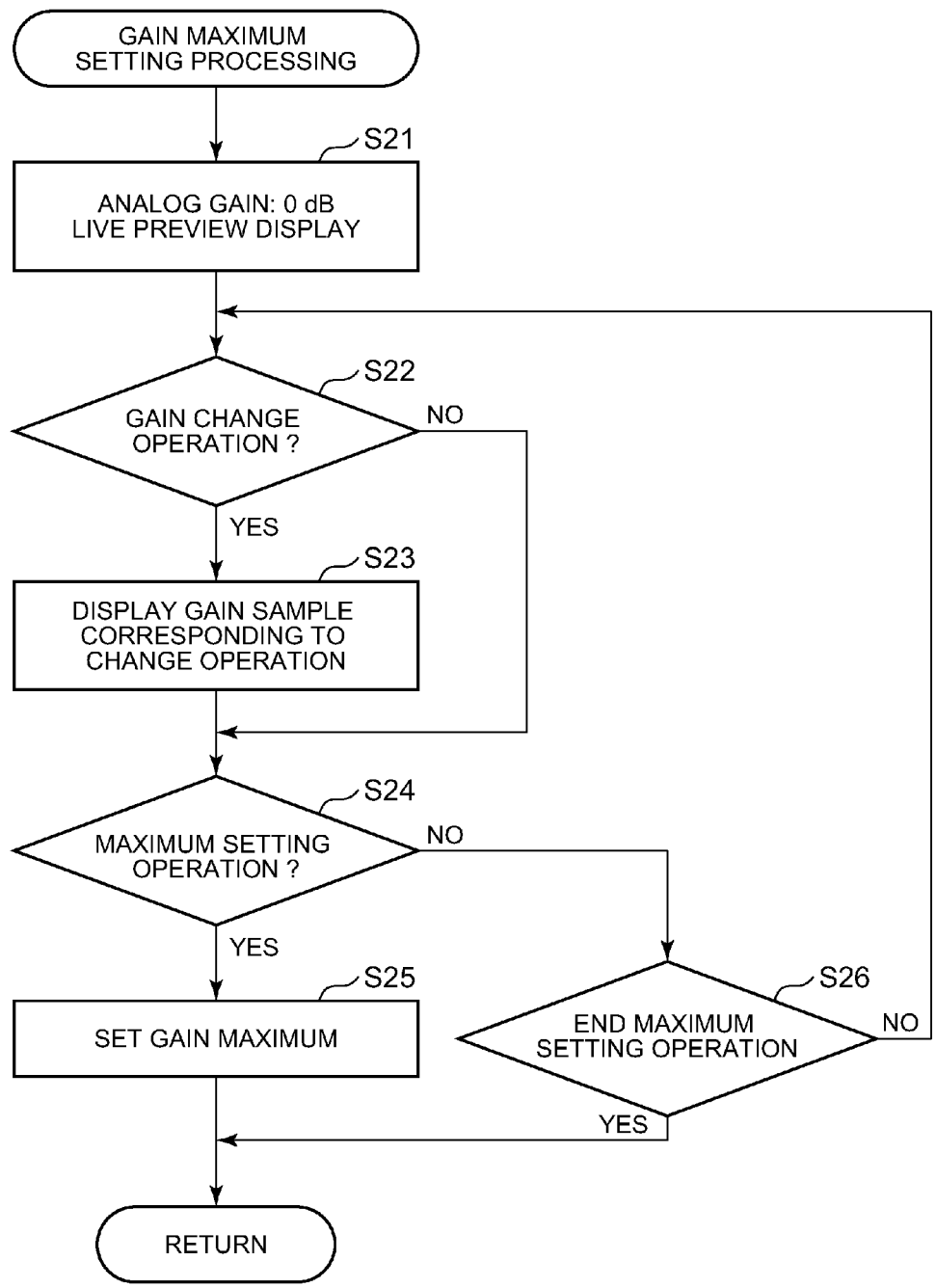
FIG. 4 is a flowchart describing in detail the flow of gain maximum setting processing in the analog gain adjustment processing of FIG. 3.

FIG. 3 and FIG. 4 are a flowchart describing the flow of the analog gain adjustment processing executed by the imaging apparatus 1 with the functional structures of FIG. 2.

In step S11, the gain setting control section 53 and the display control section 17 execute gain maximum setting processing, which sets the maximum value of the analog gain. Details of the gain maximum setting processing are described below with reference to FIG. 4.

In step S12, the analog gain control section 52 acquires imaging environment measurement values. More specifically, the analog gain control section 52 acquires the respective temperatures of the imaging apparatus 1, the imaging device 45 and the power supply unit 48 measured by the temperature measurement section 23, and the battery remaining charge amount of the power supply unit 48 measured by the battery remaining charge amount measurement section 24.

In step S13, the analog gain control section 52 makes a determination as to whether the analog gain is to be altered. More specifically, the analog gain control section 52 makes determinations as to whether any of the respective temperatures of the imaging apparatus 1, the imaging device 45 and the power supply unit 48 acquired by the analog gain control section 52 in step S12 is higher than a predetermined threshold and whether the battery remaining charge amount of the power supply unit 48 is lower than a predetermined threshold.

If it is determined that any of the respective temperatures of the imaging apparatus 1, the imaging device 45 and the power supply unit 48 is higher than the predetermined threshold or the battery remaining charge amount of the power supply unit 48 is lower than its predetermined threshold, the result of the determination in step S13 is affirmative and the processing advances to step S14.

If it is determined that none of the respective temperatures of the imaging apparatus 1, the imaging device 45 and the power supply unit 48 is higher than the predetermined threshold and that the battery remaining charge amount of the power supply unit 48 is not lower than its predetermined threshold, the result of the determination in step S13 is negative and the processing advances to step S15.

In step S14, the analog gain control section 52 increases the analog gain. More specifically, the analog gain control section 52 increases the analog gain determined by the imaging condition determination section 51.

In step S15, the exposure control section 55 carries out exposure setting. More specifically, the exposure control section 55 sets an aperture value and a shutter speed on the basis of the analog gain and a brightness.

Figure 6:
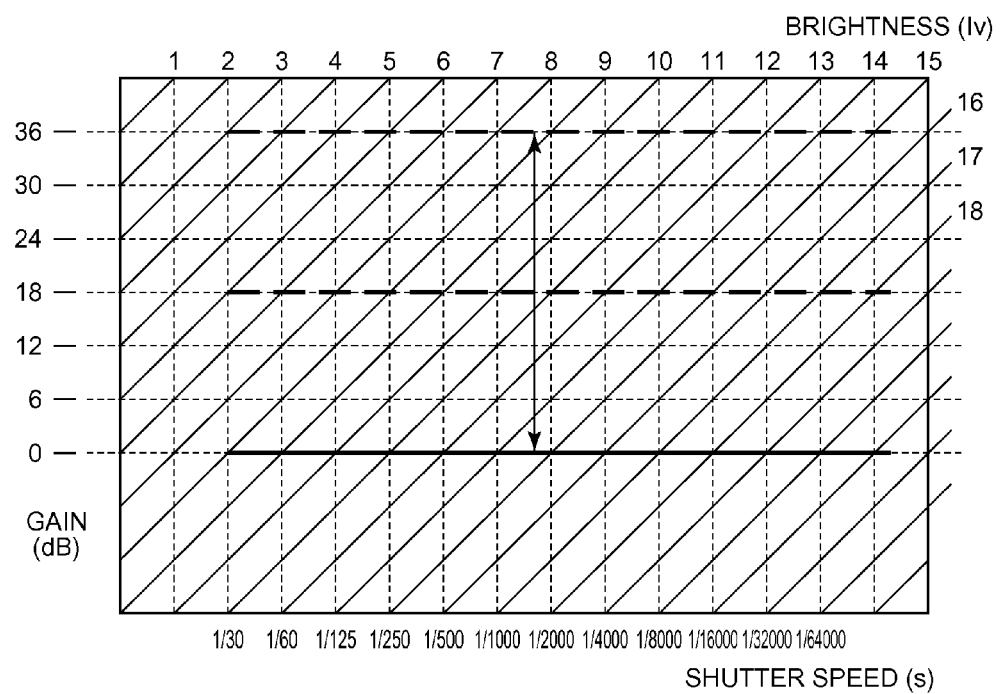
FIG. 6 is a diagram showing a program chart that is used in exposure setting by an exposure setting section of the imaging apparatus of FIG. 2.

For example, as illustrated in the program chart shown in FIG. 6, if the brightness is 13 (light value), the shutter speed is 1/500 s if the analog gain is 0 dB, and the shutter speed is 1/32000 s if the analog gain is 36 dB. In other words, for a certain brightness, the higher the analog gain, the faster the shutter speed. Meanwhile, the aperture value is initially determined by the imaging condition determination section 51 in a similar manner.

The program chart may be altered and the aperture value and shutter speed controlled in accordance with the analog gain.

When the analog gain is increased, a report thereof may be given by a message being displayed at the display section 18 or the like.

When the processing of step S15 is complete, the analog gain adjustment processing ends.

Herebelow, from the analog gain adjustment processing of FIG. 3, the gain maximum setting processing of step S11 is described in more detail.

FIG. 4 is a flowchart describing, of the analog gain setting processing of FIG. 3, the gain maximum setting processing of step S11.

In step S21, the display control section 17 implements a live preview display for a case in which the analog gain is 0 dB. More specifically, the display control section 17 starts live preview imaging processing and live preview display processing.

That is, the CPU 14 starts imaging operations by the imaging device 45, and causes these imaging operations to continue. During this processing, data of captured images that are successively outputted from the imaging device 45 is temporarily stored in the DRAM 13. This sequence of processing is referred to as "live preview imaging processing" herein.

The display control section 17 successively reads data of the captured images that have been temporarily recorded in the DRAM 13 by the live preview imaging processing, and successively displays the respectively corresponding captured images at the display section 18. This sequence of processing is referred to as "live preview display processing" herein. The captured images displayed at the display section 18 by the live preview display processing are referred to herein as "live preview images".

Figure 5A:
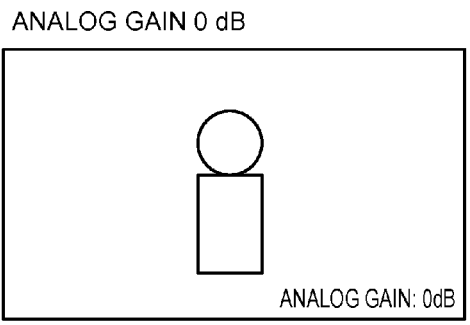
FIG. 5A to FIG. 5F are views showing examples of live preview images displayed by a display control section of the imaging apparatus of FIG. 2.
Figure 5B:
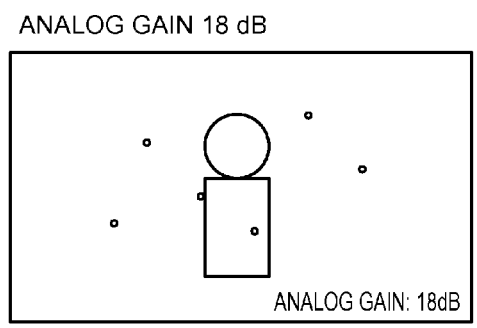
Figure 5C:
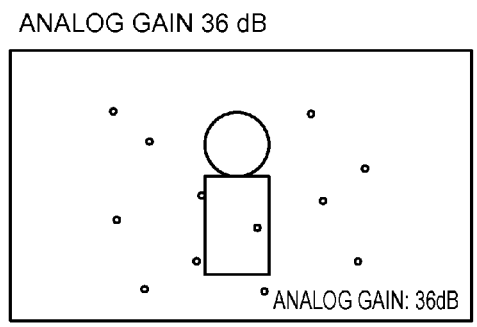
Figure 5D:
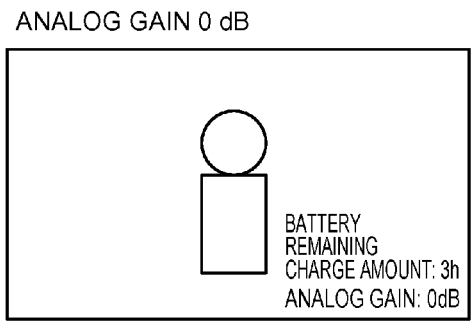

In concrete terms, noise is not apparent in the live preview images that are displayed when the analog gain is 0 dB, as illustrated in FIG. 5A and FIG. 5D. In FIG. 5D, a battery remaining charge amount calculated by the battery life calculation section 54 is displayed.

In step S22, the gain setting control section 53 makes a determination as to whether a gain change operation has been performed. Specifically, the gain setting control section 53 makes a determination as to whether there has been an input at the gain setting section 25 of a change value for when changing the analog gain.

If it is determined that a change value has been inputted, the result of the determination in step S22 is affirmative and the processing advances to step S23.

If it is determined that no change value has been inputted, the result of the determination in step S22 is negative and the processing advances to step S24.

In step S23, the display control section 17 displays an analog gain sample image corresponding to the change operation. Specifically, the display control section 17 successively reads out data of the captured images that have been temporarily recorded at the DRAM 13 and implements live preview display thereof at the display section 18 in accordance with an analog gain corresponding to the change operation.

Figure 5E:
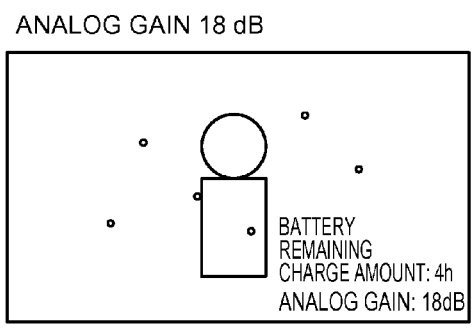
Figure 5F:
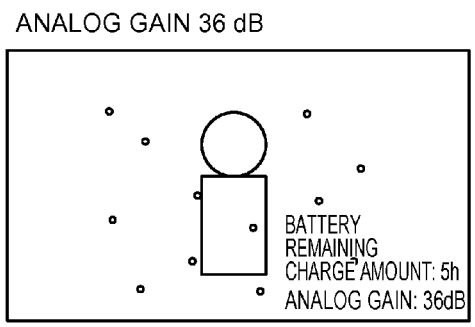

In concrete terms, the live preview images displayed are the images illustrated in FIG. 5B and FIG. 5E if the analog gain is 18 dB, and are the images illustrated in FIG. 5C and FIG. 5F if the analog gain is 36 dB. The higher the analog gain, the more noise is shown. Battery remaining charge amounts calculated by the battery life calculation section 54 are illustrated in FIG. 5E and FIG. 5F. The higher the analog gain, the greater the battery remaining charge amount that is shown.

By looking at these sample images, a user may understand the relationship between analog gain and amounts of noise, the relationship between analog gain and battery remaining charge amounts, and the relationship between noise amounts and battery remaining charge amounts. Hence, by the execution of the processing of step S24 which is described below, the user may set the maximum value of the analog gain to a desirable value while looking at the sample images.

In step S24, the gain setting control section 53 makes a determination as to whether an analog gain maximum value setting operation has been performed. Specifically, the gain setting control section 53 makes a determination as to whether there has been an input at the gain setting section 25 of a maximum value for when setting the maximum value of the analog gain.

If it is determined that a maximum value has been inputted, the result of the determination in step S24 is affirmative and the processing advances to step S25.

If it is determined that no maximum value has been inputted, the result of the determination in step S24 is negative and the processing advances to step S26.

In step S25, the gain setting control section 53 sets the analog gain maximum. Specifically, the gain setting control section 53 sets the analog gain maximum value to that inputted at step S24. Thereafter, the gain maximum setting processing ends.

In step S26, the gain setting control section 53 makes a determination as to whether an end maximum setting operation has been performed. Specifically, the gain setting control section 53 makes a determination as to whether a command has been inputted at the gain setting section 25 that causes the setting of the analog gain maximum value to end.

If it is determined that this command has been inputted, the result of the determination in step S26 is affirmative and the gain maximum setting processing ends.

If it is determined that this command has not been inputted, the result of the determination in step S26 is negative and the processing returns to step S22.

Hereabove, the first embodiment of the present invention is described.

The imaging apparatus 1 that executes the analog gain adjustment processing as described above is equipped with the analog block 11, the imaging condition determination section 51 and the analog gain control section 52.

The current consumption of the analog block 11 changes in accordance with the analog gain, which is the output amplification ratio of the imaging device 45.

The imaging condition determination section 51 determines imaging conditions, including the analog gain, in accordance with brightness of an object.

The analog gain control section 52 alters the analog gain determined by the imaging condition determination section 51 so as to reduce the current consumption of the analog block 11 in accordance with the state of the imaging apparatus 1.

Thus, in this imaging apparatus 1, the state of the imaging apparatus 1 may be controlled so as to reduce the current consumption of the analog block 11 by implementing control to alter the analog gain in accordance with the state of the imaging apparatus 1. In particular, control may be performed to reduce heat generation amounts of the imaging apparatus 1 and control may be performed to prolong the battery life of the power supply unit 48.

The imaging apparatus 1 is provided with the temperature measurement section 23.

The temperature measurement section 23 measures temperatures.

And the analog gain control section 52 alters the analog gain of the imaging device 45 in accordance with the temperatures measured by the temperature measurement section 23.

Thus, the current consumption of the analog block 11 may be controlled by control of the analog gain of the imaging device 45 in accordance with temperature.

Herein, the imaging device 45 has lower current consumption when the analog gain is higher, and the analog gain control section 52 raises the analog gain of the imaging device 45 in accordance with how high the temperatures measured by the temperature measurement section 23 are.

Therefore, because the analog gain of the imaging device 45 is raised in accordance with how much the temperature rises, currents in the analog block 11 may be reduced and heat generation in the imaging apparatus 1 may be reduced.

The temperature measurement section 23 measures temperatures of the imaging apparatus 1, the imaging device 45 and the power supply unit 48, and the analog gain control section 52 alters the analog gain of the imaging device 45 in accordance with the temperatures measured by the temperature measurement section 23.

Therefore, the current consumption of the analog block 11 may be controlled by control of the analog gain of the imaging device 45 in accordance with the temperatures of the imaging apparatus 1, the imaging device 45 and the power supply unit 48.

The imaging apparatus 1 is provided with the battery remaining charge amount measurement section 24, the battery remaining charge amount measurement section 24 measures a battery remaining charge amount of the power supply unit 48, and the analog gain control section 52 alters the analog gain of the imaging device 45 in accordance with the battery remaining charge amount measured by the battery remaining charge amount measurement section 24.

Therefore, the current consumption of the analog block 11 may be controlled by control of the analog gain of the imaging device 45 in accordance with the battery remaining charge amount of the power supply unit 48.

Here, the smaller the battery remaining charge amount measured by the battery remaining charge amount measurement section 24, the more the analog gain control section 52 raises the analog gain of the imaging device 45.

Therefore, because the analog gain of the imaging device 45 is raised in accordance with how much the battery remaining charge amount falls, currents in the analog block 11 may be reduced and the battery life may be prolonged.

The analog gain control section 52 also controls the analog gain in accordance with the relationships of noise amount increasing and current consumption falling consequent to the analog gain of the imaging device 45 being raised.

Therefore, by control of the analog gain being performed in accordance with the relationships in which noise amounts increase and current consumption falls with rises in the analog gain, the analog gain may be controlled with appropriate balance.

The imaging apparatus 1 is equipped with the gain setting section 25, and the gain setting section 25 sets the maximum of the analog gain of the imaging device 45 under the control of the analog gain control section 52.

Therefore, a maximum may be set on analog gain control. Thus, a range of tolerance of noise generation may be set.

The imaging apparatus 1 is provided with the display control section 17.

The display control section 17 displays, at the display section 18, samples of noise that would be generated by the analog gain of the imaging device 45 under the control of the analog gain control section 52 being raised.

Therefore, because samples of noise that would be generated by raising the analog gain are displayed at the display section 18, the noise amount may be checked while the maximum on analog gain control is being set.

The imaging apparatus 1 is provided with the battery life calculation section 54 and the display control section 17.

The battery life calculation section 54 calculates a battery life from currents of the analog block that would be changed by the analog gain of the imaging device 45 under the control of the analog gain control section 52 being raised.

Therefore, because a battery life that would be changed by raising the analog gain is displayed at the display section 18, the battery life may be checked while the maximum on analog gain control is being set.

The imaging apparatus 1 is provided with the exposure control section 55.

The exposure control section 55 controls exposure settings in accordance with alterations of the analog gain under the control of the analog gain control section 52.

Therefore, exposure control is performed in accordance with analog gain control, and settings may be made for suitable exposure at all times.

Herein, the exposure control section 55 alters a program chart for exposure control and controls the exposure settings in accordance with the analog gain of the imaging device 45 under the control of the analog gain control section 52.

Therefore, because the program chart is altered to control the exposure settings, exposure control by simple processing is possible.

—Second Embodiment—

Next, a second embodiment of the present invention is described.

In the first embodiment, as the analog gain adjustment processing, a sequence of processing is described that, from when imaging of an object by the imaging apparatus 1 is started until exposure settings are implemented, takes measurements of the imaging environment of the imaging apparatus 1 and adjusts the analog gain in accordance with the measurement results. In comparison, the second embodiment is similar to the first embodiment in that, from when imaging of an object by the imaging apparatus 1 is started, measurements of the imaging environment of the imaging apparatus 1 are taken and the analog gain is adjusted in accordance with the measurement results. In the second embodiment, the adjustment of the analog gain is stopped at the moment when a predetermined imaging operation is executed, in which data of a captured image (data of a video image or data of a still image) is to be stored. Thus, processing is executed such that noise in the captured image is reduced and the image quality of the video image or still image is not adversely affected. This processing of the second embodiment is referred to as "analog gain adjustment processing for image recording".

The imaging apparatus 1 in accordance with the second embodiment of the present invention has the same hardware structures as in the first embodiment. That is, FIG. 1 also shows hardware structures of the imaging apparatus 1 according to the second embodiment. The hardware structures of FIG. 1 have already been described, so are not described here.

Figure 7:
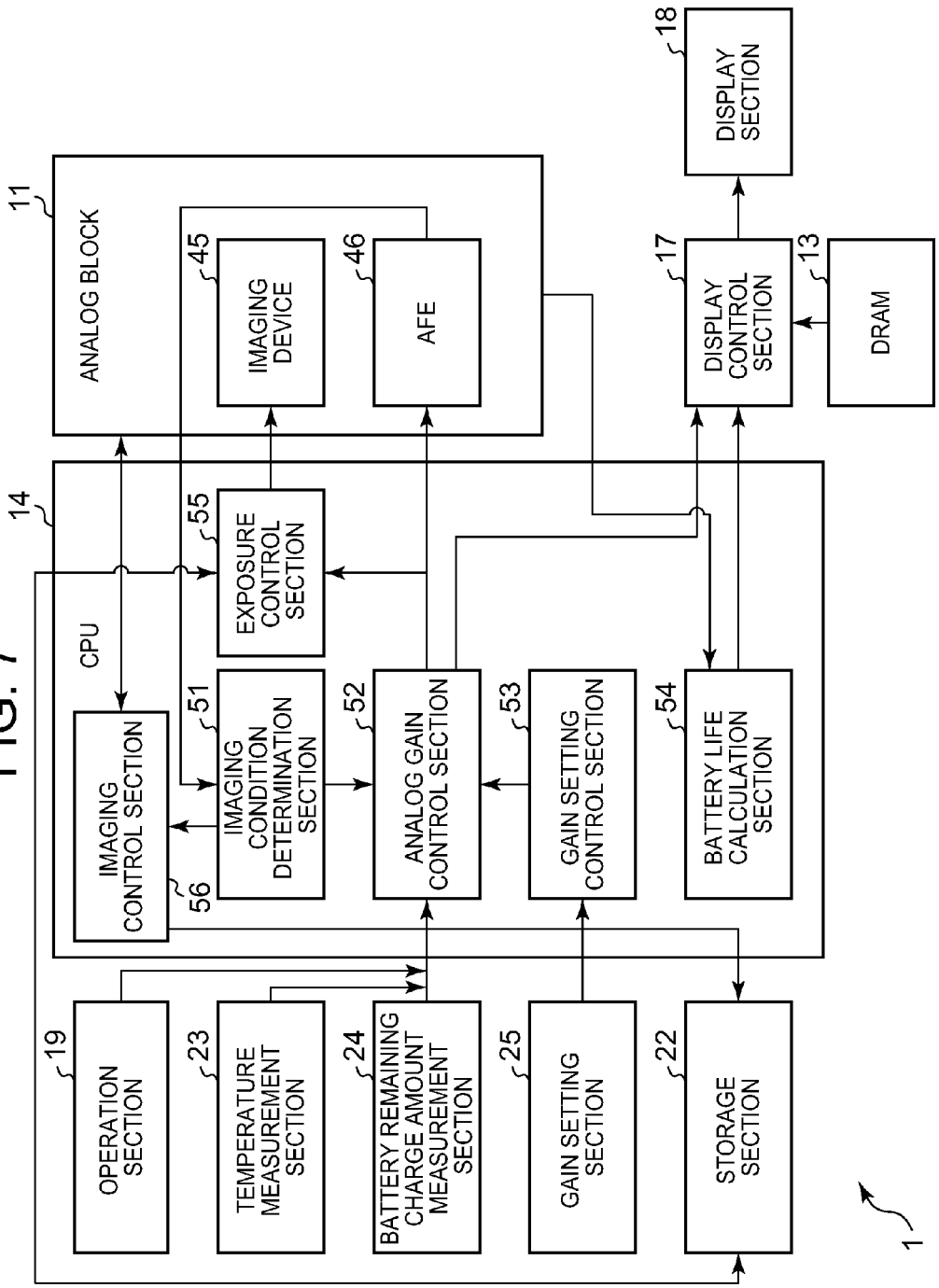
FIG. 7 is a functional block diagram illustrating, of functional structures of the imaging apparatus of FIG. 1, functional structures for implementing analog gain adjustment processing for image recording.

FIG. 7 is a functional block diagram showing, of functional structures of the imaging apparatus 1 shown in FIG. 1, functional structures for executing the analog gain adjustment processing for image recording in accordance with the second embodiment.

In the functional structures for executing the analog gain adjustment processing for image recording in accordance with the second embodiment, the operation section 19 and an imaging control section 56 are added to the functional structures of the first embodiment shown in FIG. 2.

Accordingly, of the functional structures of the imaging apparatus 1, differences from the first embodiment are principally described herebelow, and descriptions of points of similarity with the first embodiment are omitted as appropriate.

When the analog gain adjustment processing for image recording is executed, the CPU 14 acts as the imaging condition determination section 51, the analog gain control section 52, the gain setting control section 53, the battery life calculation section 54, the exposure control section 55 and the imaging control section 56.

When execution of the analog gain adjustment processing for image recording is begun, the same as in the first embodiment, the imaging condition determination section 51 receives data from the AFE 46 and determines an analog gain on the basis of the received data. The imaging condition determination section 51 also determines an aperture value and a shutter speed as imaging conditions on the basis of the received data.

The same as in the first embodiment, the analog gain control section 52 raises the analog gain in accordance with how high the temperatures measured by the temperature measurement section 23 are, specifically, respective temperatures of the imaging apparatus 1, the imaging device 45 and the power supply unit 48 (see FIG. 1), and raises the analog gain in accordance with how low the battery remaining charge amount of the power supply unit 48 (see FIG. 1) measured by the battery remaining charge amount measurement section 24 is.

Then, the analog gain control section 52 identifies an imaging operation mode in accordance with signals received from the operation section 19, which are based on instruction operations by a user. In this case, imaging operation modes include a still image recording mode, a video recording mode and a live preview display mode.

The meaning of the term "still image recording mode" as used herein includes a mode in which data of a single captured image is stored when an imaging operation is performed by the user. The meaning of the term "video recording mode" as used herein includes a mode in which data of a video image constituted by plural captured images is stored when an imaging operation is performed by the user. The meaning of the term "live preview display mode" as used herein includes a mode in which the live preview display processing described in the first embodiment is executed.

When the imaging operation mode is the still image recording mode or the video recording mode, the analog gain control section 52 stops adjustments of the analog gain and returns to the state before raising of the analog gain.

In addition, the analog gain control section 52 outputs the analog gain whose adjustment has been stopped to the AFE 46. Accordingly, the amplification ratio, of the analog image signals provided from the imaging device 45, in the amplification circuit provided at the AFE 46 is altered.

The same as in the first embodiment, the exposure control section 55 acquires the analog gain controlled by the analog gain control section 52 and controls the aperture value and the shutter speed by outputs to the aperture mechanism 43 (see FIG. 1) and the imaging device 45.

When the aperture value and the shutter speed are to be controlled, the imaging condition determination section 51 receives data from the AFE 46, and determines the aperture value and shutter speed as imaging conditions. The aperture value imaging condition is the same as that initially determined by the imaging condition determination section 51.

The imaging control section 56 supplies the aperture value and shutter speed determined by the imaging condition determination section 51 to the analog block 11, and receives captured image data (still image data or video image data) from the analog block 11. Thereafter, the imaging control section 56 stores the received captured image data at the storage section 22.

Now, the analog gain adjustment processing executed by this imaging apparatus 1 with the functional structures of FIG. 7 is described with reference to FIG. 8.

FIG. 8 is a flowchart describing the flow of the analog gain adjustment processing for image recording that is executed by the imaging apparatus 1 with the functional structures of FIG. 7.

The processing of steps S31 to S35 is the same as in steps S11 to S15 of FIG. 3, so is not described. Accordingly, the processing from step S36 onward is described herebelow.

In step S36, the analog gain control section 52 executes the live preview display processing.

In step S37, the analog gain control section 52 makes a determination as to whether a signal causing the live preview display processing to stop has been received from the operation section 19.

If the analog gain control section 52 receives this signal, the result of the determination in step S37 is affirmative, and the analog gain adjustment processing for image recording is ended. On the other hand, if the analog gain control section 52 does not receive this signal, the result of the determination in step S37 is negative and the processing advances to step S38.

In step S38, the analog gain control section 52 makes a determination as to whether an imaging instruction has been performed, that is, whether or not the imaging operation mode is one of the still image recording mode and the video recording mode. If the imaging operation mode is the still image recording mode or the video recording mode, the result of the determination in step S38 is affirmative and the processing advances to step S39.

In step S39, the analog gain control section 52 stops the adjustment of the analog gain. Thus, the analog gain control section 52 returns to the state before raising of the analog gain. Thereafter, the analog gain control section 52 advances the processing to step S40.

In step S40, the exposure control section 55 performs the exposure setting again. That is, the exposure control section 55 sets the aperture value and shutter speed again on the basis of the analog gain controlled in step S39 and the brightness.

For example, as illustrated in the program chart shown in FIG. 6, if the brightness is 13 (light value), the shutter speed is 1/32000 s if the analog gain is 36 dB, and the shutter speed is 1/500 s if the analog gain is 0 dB. In other words, for a certain brightness, the shutter speed is slowed in accordance with how much the analog gain is lowered. Meanwhile, the aperture value is initially determined by the imaging condition determination section 51 in a similar manner.

On the other hand, if it is determined in step S38 that an imaging instruction has been performed, the result of the determination in step S38 is negative and the processing returns to step S32.

Thus, until a signal causing the live preview display processing to stop is received from the operation section 19, that is, until the result of the determination in step S37 is affirmative, the analog gain control section 52 repeatedly executes the processing of steps S32 to S38 (if the result of the determination in step S38 is negative) or the processing of steps S32 to S41 (if the result of the determination in step S38 is affirmative).

In step S41, the imaging control section 56 supplies the aperture value and shutter speed determined by the imaging condition determination section 51 on the basis of the data received from the AFE 46 to the analog block 11, and receives the captured image data (still image data or video image data) from the analog block 11. Thereafter, the imaging control section 56 stores the received captured image data at the storage section 22.

When the processing of step S41 is complete, the imaging control section 56 returns the processing to step S32.

Thus, until a signal causing the live preview display processing to stop is received from the operation section 19, that is, until the result of the determination in step S37 is affirmative, the analog gain control section 52 repeatedly executes the processing of steps S32 to S38 (if the result of the determination in step S38 is negative) or the processing of steps S32 to S41 (if the result of the determination in step S38 is affirmative).

Hereabove, the second embodiment of the present invention is described.

The imaging apparatus 1 that executes the analog gain adjustment processing for image recording as described above is equipped with the analog block 11, the imaging condition determination section 51 and the analog gain control section 52.

The current consumption of the analog block 11 changes in accordance with the analog gain, which is the output amplification ratio of the imaging device 45.

The imaging condition determination section 51 determines imaging conditions, including the analog gain, in accordance with brightness of an object.

While waiting for a predetermined imaging operation, the analog gain control section 52 carries out particular processing that alters the analog gain determined by the imaging condition determination section 51 so as to reduce the current consumption of the analog block 11 in accordance with states of the imaging apparatus 1, and when the predetermined imaging operation is performed, the analog gain control section 52 stops the particular processing.

Thus, in this imaging apparatus 1, the current consumption of the analog block 11 may be reduced by carrying out the particular processing in accordance with states of the imaging apparatus 1 while waiting for a predetermined imaging operation. In particular, control may be performed to reduce heat generation amounts of the imaging apparatus 1 and control may be performed to prolong the battery life of the power supply unit 48. As a result, the amount of captured images captured by the imaging apparatus 1 may be increased.

However, noise in the captured images may increase. Therefore, by stopping the particular processing when the predetermined imaging operation is performed, the noise in captured images may be reduced and a deterioration in the quality of captured images may be prevented.

The predetermined imaging operation is an operation that captures an image to be stored in the storage section 22, and stores the captured image data obtained by the imaging to the storage section 22.

Therefore, the noise in captured images may be reduced and a deterioration in the quality of captured images prevented by stopping the particular processing at the time of the operation that stores the captured image data.

It should be noted that the present invention is not limited to the embodiments described above, and any modifications and improvements thereto within a scope that can realize the object of the present invention are included in the present invention.

In the first and second embodiments described above, the imaging apparatus 1 in which the present invention is employed is described as being a digital camera, as an example, but this is not particularly limiting.

For example, the present invention is not limited to the imaging apparatus 1 and may be employed in portable telephones, smartphones and the like with image recording functions, and may be generally employed in electronic equipment with image recording functions. Specifically, the present invention is applicable to, for example, notebook computers, printers, television sets, video cameras, portable navigation apparatuses, portable video game machines and so forth.

The processing sequence described above can be executed by hardware, and also can be executed by software.

That is, the functional structures in FIG. 2 and FIG. 7 are merely examples and are not particularly limiting. In other words, it is sufficient that the imaging apparatus 1 be provided with functions capable of executing the above-described sequence of processing as a whole; the kinds of functional blocks used for executing the functions are not particularly limited by the examples in FIG. 2 and FIG. 7.

A single functional block may be configured by a single piece of hardware, a single installation of software, or any combination thereof.

In a case in which the processing sequence is to be executed by software, a program configuring the software is installed from a network or a storage medium into a computer or the like.

The computer may be a computer embedded in dedicated hardware. Alternatively, the computer may be a computer capable of executing various functions by installing various programs, e.g., a general-purpose personal computer.

As well as the removable medium 31 in FIG. 1 that is distributed separately from the main body of the equipment for supplying the program to users, a recording medium containing such a program may be constituted by a recording medium that is supplied to users in a state of being incorporated in the main body of the equipment. The removable medium 31 is constituted by, for example, a magnetic disc (such as a floppy disk), an optical disc, a magneto-optical disc or the like. The optical disk is composed of a CD-ROM (Compact Disc-Read Only Memory), a DVD (Digital Versatile Disc), or the like, for example. The magneto-optical disk is composed of an MD (Mini-Disk) or the like. The storage medium supplied to the user in a state incorporated in the apparatus main body in advance may include the ROM 15 of FIG. 1, a hard disk (not shown in the drawings) or the like in which the program is recorded, for example.

It should be noted that the steps in the present specification describing the program recorded in the storage medium include not only processing executed in a time series following this order, but also processing that is not necessarily executed in a time series but is executed in parallel or individually.

Moreover, the term "system" as used in the present specification is intended to include the whole of equipment constituted by plural apparatuses, plural units and the like.

A number of embodiments of the present invention are explained hereabove. These embodiments are merely examples and do not limit the technical scope of the invention. The present invention may be attained by numerous other embodiments, and numerous modifications such as omissions, substitutions and the like are possible within a technical scope not departing from the spirit of the invention. These embodiments and modifications are to be encompassed by the scope and gist of the invention recited in the present specification, etc., and are encompassed by the inventions recited in the attached claims and their equivalents. While the present invention has been described with reference to the preferred embodiments, it is intended that the invention be not limited by any of the details of the description therein but includes all the embodiments which fall within the scope of the appended claims.

What is claimed is:

1. An imaging apparatus comprising:
an analog block for imaging processing, in which current consumption changes in accordance with an analog gain, which is an amplification ratio of outputs of an imaging device;
a determination section that determines imaging conditions including the analog gain, in accordance with a brightness of an object imaged by the imaging device;
a judgement section that judges whether it is necessary to reduce the current consumption of the analog block for imaging processing, in accordance with an internal state of the imaging apparatus;
an analog gain control section that alters the analog gain determined by the determination section such that the current consumption of the analog block is reduced, in a case in which the judgment section judges that it is necessary to reduce the current consumption of the analog block;
a calculation section that calculates a battery life of a battery from a current of the analog block that changes consequent to the analog gain determined by the determination section being raised under the control of the analog gain control section; and
a display control section that displays, on a display, the battery life calculated by the calculation section.

2. The imaging apparatus according to claim 1, further comprising a temperature measurement section that measures a temperature,
wherein in a case in which a temperature measured by the temperature measurement section is higher than a predetermined threshold, the judgment section judges that it is necessary to reduce the current consumption of the analog block for imaging processing.

3. The imaging apparatus according to claim 2, wherein the current consumption of the analog block falls in accordance with how much the analog gain is raised, and
wherein the analog gain control section performs control so as to further raise the analog gain determined by the determination section in accordance with how high the temperature measured by the temperature measurement section is.

4. The imaging apparatus according to claim 2, wherein the temperature measurement section measures a temperature of at least one of the imaging apparatus, the imaging device, and the battery, and
wherein the analog gain control section alters the analog gain determined by the determination section in accordance with the temperature measured by the temperature measurement section.

5. The imaging apparatus according to claim 1, further comprising a battery remaining charge amount measurement section that measures a battery remaining charge amount of the battery,
wherein in a case in which the battery remaining charge amount measured by the battery remaining charge amount measurement section is lower than a predetermined threshold, the judgment section judges that it is necessary to reduce the current consumption of the analog block for imaging processing.

6. The imaging apparatus according to claim 5, wherein the analog gain control section raises the analog gain determined by the determination section in accordance with how much the battery remaining charge amount measured by the battery remaining charge amount measurement section decreases.

7. The imaging apparatus according to claim 1, wherein the analog gain control section controls the analog gain in accordance with relationships in which a noise amount increases and current consumption falls consequent to the analog gain determined by the determination section being raised.

8. The imaging apparatus according to claim 7, further comprising a setting section that sets a maximum of the analog gain determined by the determination section under the control of the analog gain control section.

9. The imaging apparatus according to claim 8, wherein the display control section displays, on the display, a sample of noise generated by raising the analog gain determined by the determination section under the control of the analog gain control section.

10. The imaging apparatus according to claim 1, further comprising an exposure control section that controls an exposure setting in accordance with the analog gain altered by control of the analog gain control section after the determination made by the determination section.

11. The imaging apparatus according to claim 10, wherein the exposure control section alters a program chart for exposure control and controls the exposure setting in accordance with the analog gain altered by control of the analog gain control section.

12. The imaging apparatus according to claim 1, wherein, during waiting for a predetermined imaging operation, the analog gain control section performs particular processing that alters the analog gain determined by the determination section such that the current consumption of the analog block is reduced, and at a time of the predetermined imaging operation, the analog gain control section stops the particular processing.

13. The imaging apparatus according to claim 12, wherein the predetermined imaging operation is an operation of performing imaging for storage to a storage medium, in a period until data of a captured image obtained by the imaging is stored to the storage medium.

14. The imaging apparatus according to claim 1, further comprising a reporting section that, when the analog gain determined by the determination section is controlled so as to be altered by the analog gain control section, reports the alteration.

15. An imaging method of an imaging apparatus that includes an analog block for image processing, in which current consumption changes in accordance with an analog gain, which is an amplification ratio of outputs of an imaging device, the imaging method comprising:
determining imaging conditions including the analog gain, in accordance with a brightness of an object imaged by the imaging device;
judging whether it is necessary to reduce the current consumption of the analog block for imaging processing, in accordance with an internal state of the imaging apparatus;
altering the determined analog gain determined in the determining such that the current consumption of the analog block is reduced, in a case in which it is judged in the judging that it is necessary to reduce the current consumption of the analog block;
calculating a battery life of a battery from a current of the analog block that changes consequent to the analog gain determined in the determining being raised in the altering; and
displaying, on a display, the battery life calculated in the calculating.

16. A non-transitory computer readable storage medium having stored therein a program executable by a computer controlling an imaging apparatus that includes an analog block for imaging processing, in which current consumption changes in accordance with an analog gain, which is an amplification ratio of outputs of an imaging device, the program causing the computer to realize functions comprising:

a determination function that determines imaging conditions including the analog gain, in accordance with a brightness of an object imaged by the imaging device;

a judgment function that judges whether it is necessary to reduce the current consumption of the analog block for imaging processing, in accordance with an internal state of the imaging apparatus;

an analog gain control function that alters the analog gain determined by the determination function such that the current consumption of the analog block is reduced, in a case in which it is judged by the judging function that it is necessary to reduce the current consumption of the analog block;

a calculation function that calculates a battery life of a battery from a current of the analog block that changes consequent to the analog gain determined by the determination function being raised under the control of the analog gain control function; and a display control function that displays, on a display, the battery life calculated by the calculation function.

* * * * *